United States Patent
Belenkiy et al.

(10) Patent No.: US 6,471,412 B1
(45) Date of Patent: Oct. 29, 2002

(54) FIBER OPTIC CONNECTOR RECEPTACLE

(75) Inventors: Yuriy Belenkiy, Niles, IL (US); Igor Grois, Northbrook, IL (US); B. Daniel Szilagyi, Downers Grove, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/498,513

(22) Filed: Feb. 4, 2000

(51) Int. Cl.[7] .................................................. G02B 6/36
(52) U.S. Cl. .............................. 385/53; 385/70; 385/73; 385/137; 385/139
(58) Field of Search .............................. 385/70, 73, 77, 385/78, 139, 137, 53

(56) References Cited

U.S. PATENT DOCUMENTS

| | | | |
|---|---|---|---|
| 4,611,887 A | 9/1986 | Glover et al. | 350/96.21 |
| 4,712,861 A | 12/1987 | Lukas et al. | 350/96.21 |
| 4,779,950 A | 10/1988 | Williams | 350/96.21 |
| 4,960,317 A | 10/1990 | Briggs et al. | 360/96.21 |
| 5,104,242 A | 4/1992 | Ishikawa | 385/53 |
| 5,202,949 A | 4/1993 | Hileman et al. | 385/134 |
| 5,329,604 A | 7/1994 | Baldwin et al. | 285/92 |
| 5,363,460 A | 11/1994 | Marazzi et al. | 285/70 |
| 5,506,922 A | 4/1996 | Grois et al. | 385/75 |
| 5,570,445 A | 10/1996 | Chou et al. | 385/92 |
| 5,708,745 A | 1/1998 | Yamaji et al. | 385/92 |
| 5,845,036 A | 12/1998 | De Marchi | 385/139 |
| 5,909,526 A | 6/1999 | Roth et al. | 385/78 |
| 6,004,043 A | * 12/1999 | Abendschein et al. | 385/76 |
| 6,108,482 A | * 8/2000 | Roth | 385/139 |
| 6,331,079 B1 | * 12/2001 | Grois et al. | 385/53 |
| 6,425,694 B1 | * 7/2002 | Szilagyi et al. | 385/76 |

OTHER PUBLICATIONS

IBM Technical Disclosure Bulletin, Fiber–Optic Connector Interface Scheme that Provides for Worldwide Class 1 Laser Certification, Jan. 1994.
Research Disclosure (Anonymous), Fiber Optic Module Interface Attachment, Oct., 1991.

* cited by examiner

Primary Examiner—Hemang Sanghavi
Assistant Examiner—Juliana K. Kang
(74) Attorney, Agent, or Firm—A. A. Tirva

(57) ABSTRACT

A receptacle for receiving a fiber optic connector along an optic axis. The receptacle includes a housing having an open end for receiving the fiber optic connector inserted thereinto on the optic axis, along with an opening remote from the open end. A shutter member is fitted through the opening and is mounted for pivotal movement toward and away from the optic axis to close and open the open end of the housing.

8 Claims, 3 Drawing Sheets

US 6,471,412 B1

FIBER OPTIC CONNECTOR RECEPTACLE

FIELD OF THE INVENTION

This invention generally relates to the art of fiber optic connectors and, particularly, to a receptacle, such as an adapter, for receiving a fiber optic connector at one or both ends of the adapter.

BACKGROUND OF THE INVENTION

Fiber optic connectors of a wide variety of designs have been employed to terminate optical fiber cables and to facilitate connection of the cables to other cables or other optical fiber transmission devices. A typical optic fiber connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems are encountered when terminating optical fibers in fiber optic connectors versus terminating electrical conductors in electrical connectors, when situations arise wherein a fiber end of an "active" fiber optic connector is exposed. A typical situation might arise when one of the fiber optic connectors at one end of an adapter is removed, leaving the other "active" fiber optic connector in the adapter.

In particular, an exposed fiber end may be damaged by adverse environmental hazards, and the accumulation of dust and dirt may impair the optical transmission capabilities of the fiber. Another very important problem is to protect an operator's eyes from dangerous light beams from the exposed end of an active optical fiber. For instance, an operator's eyes may be damaged from dangerous light beams exiting an unprotected receptacle or adapter.

Heretofore, dust covers, end caps or spring-loaded shutters have been used to close an open end of an adapter to, thereby, cover the exposed fiber ends to protect the fiber ends from adverse environmental hazards and to prevent light energy from the fiber ends from exiting the adapter. One such spring-loaded shutter is pivotally mounted on the adapter adjacent the open end thereof and is pivotally movable to close and open the open end. The shutter member extends across the optic axis of the connector/adapter assembly when the shutter member is closed. The shutter member may be pivotable away from the optic axis to its open condition upon engagement by the inserted fiber optic connector.

Such pivotally mounted shutters as described above can be mounted either on the outside or the inside of the adapter. In many instances, the shutter cannot be mounted on the outside of the adapter for swinging outwardly to an open position because of the lack of surrounding space. Inside shutters cause problems because they are extremely difficult to assemble within the adapter housing, keeping in mind that fiber optic connectors, adapters and the like are very small assemblies. The invention herein is directed to solving these various problems, particularly by providing a unique structure for mounting a shutter inside a receptacle housing, such as inside an adapter housing.

SUMMARY OF THE INVENTION

An object, therefore, of the invention is to provide a new and improved receptacle for receiving a fiber optic connector along an optic axis.

In the exemplary embodiment of the invention, the receptacle includes a housing having at least one open end for receiving the fiber optic connector inserted thereinto on the optic axis. An opening is provided in the housing remote from the open end. A shutter member is fitted through the opening and is mounted for pivotal movement toward and away from the optic axis to close and open the open end.

As disclosed herein, the remote opening is in a side wall of the housing. A mounting plate is fitted in the opening and, preferably, is sized to substantially close the opening. The shutter member is pivotally mounted on the mounting plate and is disposed within the housing.

Other features of the receptacle include a spring operatively associated between the shutter member and the mounting plate for biasing the shutter member toward a closed position. A self-contained shutter assembly, thereby, can be provided, including the mounting plate, the shutter member and the spring. The mounting plate is shown herein as press-fit into the housing opening by means of at least one mounting post on the mounting plate press-fit into a mounting hole in the housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
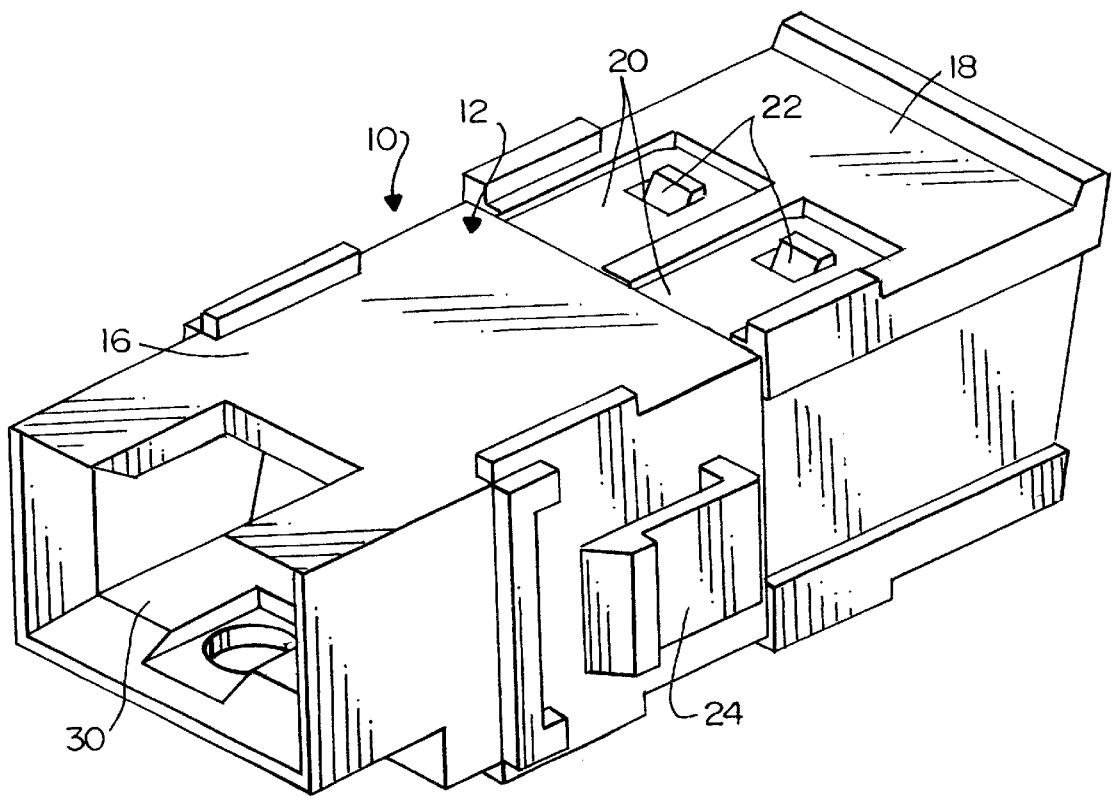
FIG. 1 is a top perspective view of a receptacle for receiving a pair of fiber optic connectors and incorporating a shutter assembly embodying the concepts of the invention, with the shutter assembly removed from the adapter housing to facilitate the illustration.
Figure 1:
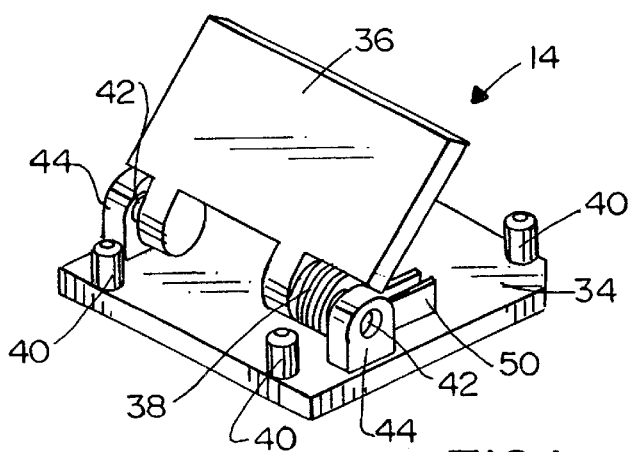

Referring to the drawings in greater detail, the invention is disclosed herein as incorporated in a double-ended adapter, generally designated 10, which includes a two-part housing, generally designated 12, and a shutter assembly, generally designated 14. Although the invention is disclosed in an adapter, the concepts of the invention are equally applicable for a wide range of receptacles for receiving a fiber optic connector or other optical fiber transmission device along an optic axis. Therefore, the term "fiber optic connector" is used herein and in the claims hereof in a generic sense to include a variety of optical fiber transmission devices.

Figure 2:
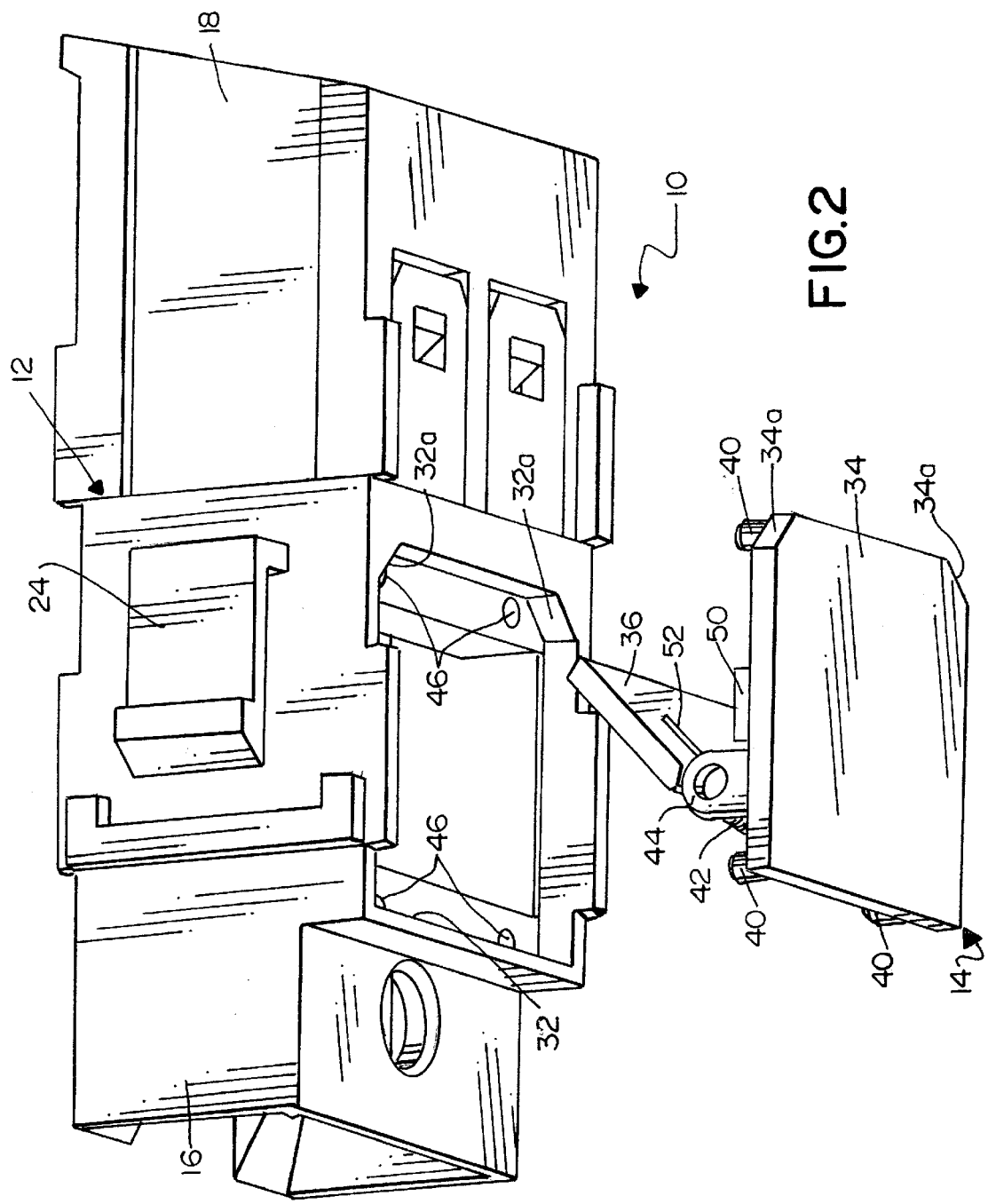
FIG. 2 is a bottom perspective view of the adapter, again with the shutter assembly removed to facilitate the illustration.
Figure 3:
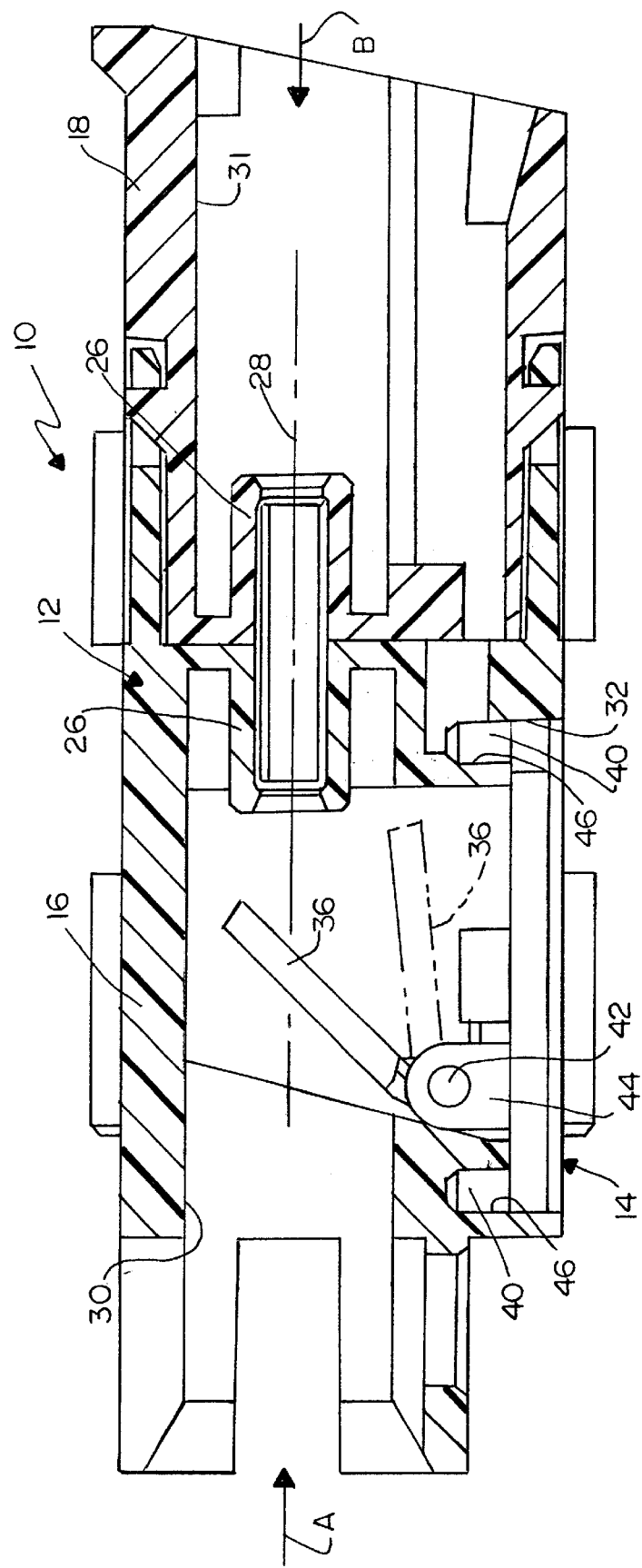
FIG. 3 is an axial section taken through the adapter, with the shutter assembly mounted on the adapter housing.

With that understanding, adapter housing 12 is generally rectangular in cross-section and includes a first rectangular housing part 16 coupled to a second rectangular housing part 18 by means of a plurality of latch arms 20 of the first housing part latchingly engageable with a plurality of latch bosses 22 on the second housing part. As best seen in FIGS. 1 and 2, first housing part 16 includes a pair of latch arms 24 on opposite sides thereof for latchingly engaging an appropriate structure within which receptacle 10 is to be mounted. As best seen in FIG. 3, both housing parts include interior aligned cylindrical bosses 26 which receive the projecting ferrules of a pair of fiber optic connectors so that their encapsulated fibers are connected end-to-end along an optic axis 28. First housing part 16 has an open end 30 for receiving a first fiber optic connector in the direction of arrow "A" (FIG. 3), and second housing part 18 has an open end 31 for receiving a second or mating fiber optic connector in the direction of arrow "B".

The invention herein contemplates a unique system for mounting a shutter on the inside of a receptacle housing. As stated in the "Background", above, interior shutters are extremely difficult to assemble within very small fiber optic receptacles. It is particularly difficult to assemble the shutter through the open end of the receptacle which receives the fiber optic connector. Generally, the invention contemplates mounting the shutter on the interior of the receptacle through an opening remote from the open end of the receptacle housing.

Specifically, as seen in FIGS. 2 and 3, first housing part 16 of the two-part housing 12 includes an opening 32 within which shutter assembly 14 is mounted. More particularly, shutter assembly 14 is a self-contained assembly and includes a mounting plate 34, a shutter member 36 pivotally mounted to the mounting plate, a coil spring 38 for biasing the shutter member toward a closed position and a plurality of mounting posts 40 to facilitate mounting the shutter assembly within opening 32 of the adapter housing.

Opening 32 is generally rectangular, and mounting plate 34 of shutter assembly 14 is sized and shaped to fit within the opening and substantially close the opening. A pair of corners 32a of the opening and a pair of corners 34a of the mounting plate are angled to prevent the shutter assembly from being fitted within the opening in the wrong direction.

Shutter member 36 is pivotally mounted to mounting plate 34 by means of a pair of pivot shafts 42 on the shutter member received in a pair of pivot journals 44 projecting from mounting plate 34. Both the shutter member and the mounting plate may be fabricated of plastic material, and the pivot posts and pivot journals, respectively, may be molded integrally with those components.

Generally, means are provided for press fitting shutter assembly 14 within opening 32 of the adapter housing. Specifically, mounting posts 40 are press-fit within a plurality of mounting holes 46 (FIGS. 2 and 3) of first housing part 15 inwardly of opening 32. Mounting posts 40 can be molded integrally with mounting plate 34. As best seen in FIG. 3, shutter member 36 is pivotally mounted for pivotal movement to generally close open end 30 with respect to optic axis 28. As seen by full lines in FIG. 3, shutter member 36 extends across optic axis 28 when the shutter member is closed, as shown. The shutter member is pivotable away from the optic axis toward the dotted-line position upon engagement by the inserted fiber optic connector in the direction of arrow "A".

Finally, spring 38 (FIG. 1) is operatively associated between shutter member 36 and mounting plate 34 for biasing the shutter member toward its closed position as shown in full lines in FIG. 3. The spring is a coil spring which may surround one of the pivot shafts 42 of the shutter member. One end of the coil spring is captured within a channel 50 (FIG. 1) on the inside of mounting plate 34, and an opposite end 52 (FIG. 2) of the coil spring biases against the back side of shutter member 32, to maintain the coil spring in a loaded condition and to bias the shutter member toward its closed position.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A receptacle for receiving a fiber optic connector along an optic axis, comprising:

a housing having an open end for receiving the fiber optic connector inserted thereinto on said optic axis, and an opening in a side wall of the housing remote from said open end;

a mounting plate fitted in said opening and sized to substantially close the opening; and a shutter member pivotally mounted on the mounting plate independent of the housing, the shutter member being located within the housing for pivotal movement toward and away from the optic axis to close and open said open end.

2. The receptacle of claim 1, including spring means operatively associated between the shutter member and the mounting plate for biasing the shutter member toward a closed position.

3. The receptacle of claim 1, including means for press-fitting said mounting plate in said opening.

4. The receptacle of claim 3, wherein said press-fitting means comprise at least one mounting post on the mounting plate press-fit into a mounting hole in the housing.

5. A receptacle for receiving a fiber optic connector along an optic axis, comprising:

a housing having an open end for receiving the fiber optic connector inserted thereinto on said optic axis, and an opening in a side wall of the housing remote from said open end; and a self-contained shutter assembly including a mounting plate fitted into said opening, a shutter member pivotally mounted on the mounting plate independent of the housing for pivotal movement toward and away from the optic axis to close and open said open end, and spring means operatively associated with the shutter member for biasing the shutter member toward a closed position.

6. The receptacle of claim 5 wherein said mounting plate is sized to substantially close said opening.

7. The receptacle of claim 5, including means for press-fitting said mounting plate in said opening.

8. The receptacle of claim 7 wherein said press-fitting means comprise at least one mounting post on the mounting plate press-fit into a mounting hole in the housing.

* * * * *